(12) United States Patent
Maynard

(10) Patent No.: US 12,237,675 B2
(45) Date of Patent: Feb. 25, 2025

(54) ENERGY STORAGE AND RECOVERY SYSTEM

(71) Applicant: Frank Maynard, Madras, OR (US)

(72) Inventor: Frank Maynard, Madras, OR (US)

( * ) Notice: Subject to any disclaimer, the term of this patent is extended or adjusted under 35 U.S.C. 154(b) by 0 days.

(21) Appl. No.: 18/890,702

(22) Filed: Sep. 19, 2024

(65) Prior Publication Data

US 2025/0015630 A1    Jan. 9, 2025

Related U.S. Application Data

(62) Division of application No. 18/132,046, filed on Apr. 7, 2023, now abandoned.

(60) Provisional application No. 63/328,450, filed on Apr. 7, 2022.

(51) Int. Cl.
*F03G 3/00* (2006.01)
*H02J 3/28* (2006.01)
*H02J 15/00* (2006.01)

(52) U.S. Cl.
CPC .............. *H02J 15/007* (2020.01); *H02J 3/28* (2013.01); *F03G 3/094* (2021.08)

(58) Field of Classification Search
CPC ............ H02J 15/007; H02J 3/28; F03G 3/094
See application file for complete search history.

(56) References Cited

FOREIGN PATENT DOCUMENTS

| GB | 2594526 A | * | 11/2021 | ............. | F03G 3/094 |
| WO | WO-2022084493 A1 | * | 4/2022 | ............. | F03B 13/14 |

* cited by examiner

*Primary Examiner* — Daniel Cavallari
(74) *Attorney, Agent, or Firm* — Donn K. Harms

(57) ABSTRACT

An electric energy storage and recovery system is provided to store electric energy from a generator when it is not required for the electric power grid. The system employs a controller to switch a generator between operating as an electric motor in power storage mode and operating as a generator in a power generation mode. A weight engaged to a distal end of a cable may be wound upon a reel by the generator when operating as an electric motor. The weight, in an elevated position, will pull the cable from the reel to rotate the generator and produce electric power when operating in power generation mode.

3 Claims, 6 Drawing Sheets

ENERGY STORAGE AND RECOVERY SYSTEM

This application is a Continuation of U.S. patent application Ser. No. 18/132,046 filed on Apr. 7, 2023 which claims priority to U.S. Provisional Patent Application 63/328,450 filed on Apr. 7, 2022.

BACKGROUND OF THE INVENTION

1. Field of the Invention

The invention herein disclosed relates generally to electric energy and the storage and recovery thereof. More particularly, it relates to a system to store electric power using a weight-enabled electric energy storage and generation system which is easily positioned in homes, businesses, and multi-story buildings.

2. Prior Art

Electric energy has become the cornerstone throughout the world for the provision of power to energize homes and businesses. With the advent of modern battery powered vehicles, the need for a constant and plentiful supply of electricity has become a necessity in most countries of the world.

Conventionally, electric power, supplied to the electric grid and communicated to homes and businesses, has been primarily provided by large power plants which use either water power to turn generators or employ natural gas or oil to generate steam to provide rotation to such generators. The resulting electric power is communicated over wires forming a grid, to the home and commercial customers.

In recent times other modes of electric power generation have begun to augment this centrally generated electric power from power plants. Such are conventionally known as renewable energy and primarily include solar panels which generate electric power and windmills which are engaged to generators which supply an augmentation of electric power to the conventional power grid.

However, there are problems with both cost and supply of both conventionally generated power plant energy and renewable energy. With regard to power plant generated energy, due to overloading of the grid during hot and cold weather and other reliability issues, there exists a continuous potential for a power outage to home and commercial customers. Further, in many countries, the electrical utilities have gone to a pricing structure which charges more for power delivered during high demand time frames. A means to store electric power for use in the event of a power outage or which may be charged during low cost grid time frames and employed during high cost grid time frames is highly desirable. However, to date, the only reliable storage means for such uses involves large and expensive battery systems which few homes and businesses can afford.

In the generation of renewable energy, which has the potential to lower energy costs and increase supply, a continuing and vexing issue is the fact that the value of two prominent renewable energy sources is compromised by their irregular nature. Wind is inherently variable and on some days power can be generated when it is windy. However, on many days and at many times of almost every day, there is insufficient wind to generate electric power.

Consequently, a mismatch frequently occurs between potential energy available from low winds during periods of peak demand and high winds during periods when the demands of the electrical grid may be low, such as in the evening. Further, due to the nature of wind farms being located distant to cities requiring energy, frequently, the power generated in wind farms is during hours of the day when it is not needed for the grid, or the generated power can exceed the capacity of the transmission lines communicating the power to the grid requiring it. Unable to transmit the power generated during peak winds due to lack of need for the grid, frequently, windfarms will idle turbines which could be producing electrical energy at a maximum rate.

Solar energy suffers its own constraints. First, solar energy is only produced during the day, which may be advantageous in the summer when consumer air conditioning demands peak during the day. However, in other months of the year, the periods of peak demand are in the early mornings and evenings when little or no solar power is produced. Thus, energy on such solar farms, available at mid day, may go unused due to a lack of demand of the power grid. Additionally, solar energy farms also are frequently located a good distance from the power grids they serve and transmission lines can limit the amount of power that may be communicated from the solar generation facility to the distant grid. If transmission lines lack the capacity to transmit the full amount of power a solar generation facility can produce at mid day in bright sunlight, the energy can go to waste.

As a consequence, an easily installed and highly reliable electric energy storage system which can be employed on a commercial scale or in homes and businesses is highly desirable.

With respect to the above, before explaining at least one preferred embodiment of the electrical energy storage and recovery system herein, it is to be understood that the disclosed ladder device and system are not limited in application to the details of employment and to the arrangement of the components or the steps set forth in the following description or illustrated in the drawings. The various apparatus and operations of the herein disclosed electric energy storage and recovery system herein are capable of other embodiments, and of being practiced and carried out in various ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based may readily be utilized as a basis for other weight enabled energy storage and recovery systems. It is important, therefore, that the embodiments, objects and claims herein, be regarded as including such equivalent construction and methodology insofar as they do not depart from the spirit and scope of the present invention.

SUMMARY OF THE INVENTION

The energy storage and recovery system herein provides an easily deployed electric energy storage system. The system is configured of easily assembled components which are scalable to allow for use in homes, businesses, large buildings, and at solar farms and windmill farms, to store electric energy for later use.

In one mode of the system, such as may be employable on an energy farm such as that using windmills and/or solar panels, a weight will be operatively connected to the electric power source provided from such renewable sources or from the grid. During times where renewable energy is not communicable to the grid or where the grid has excess capacity, the energy may be stored by employment of a motor-generator which is energized to elevate one or a plurality of weights along a ramp.

In another mode of the system, electric energy from such energy farms or the grid, which is either not needed or not communicable to the grid, is stored by energizing the motor-generator to retract an engaged cable and cause the elevation of one or a plurality of weights vertically from a frame or within a shaft.

In another mode of the system, which is configured for use on multi-story buildings, grid power, which is supplied during low cost time periods, can be employed to energize the motor-generator to a lifting mode, wherein one or a plurality of weights is elevated within an elongated vertical shaft in the building. Such may be added to the side of the building, or in some cases, an elevator shaft might be used or altered to allow such use. The motor-generator is switched to power generation mode during periods of time where the grid is charging high prices for electricity to feed the power requirements of the building to thereby lower the operating costs. The building might also be fitted with renewable electric energy generating components and the electrical power, so generated, can be stored and used in the same fashion to supplement the grid power and lower or even eliminate electricity costs.

With respect to the above description, before explaining at least one preferred detailed embodiment of the energy storage and recovery system herein, it is to be understood that the invention is not limited in its application to the details of operation nor the arrangement of the components or the steps set forth in the following description or illustrations in the drawings. The various methods of implementation and operation of the energy storage and recovery system herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other weight-enabled electric energy storage and recovery systems and for carrying out the several purposes of the disclosed communication system. Therefore, the objects and claims herein should be regarded as including such equivalent construction, steps, and methodology insofar as they do not depart from the spirit and scope of the present invention.

It is an object of this invention to provide an easily deployed and operated electric energy storage and recovery system which stores electric power from a power source, and subsequently provides electric power when needed by the user or when grid prices are more expensive.

It is a further object of this invention to provide such an energy storage and recovery system which is highly reliable and may be positioned in homes, businesses, buildings and power generation locations, to store electric energy.

These, together with other objects and advantages which will become subsequently apparent, reside in the details of the construction and operation of the disclosed electric energy storage and recovery system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURE

The accompanying drawings, which are incorporated herein and form a part of the specification, illustrate some, but not the only or exclusive examples of embodiments and/or features of the deployable hand rail system herein. It is intended that the embodiments and figures disclosed herein are to be considered illustrative of the invention herein, rather than limiting in any fashion.

DETAILED DESCRIPTION OF THE
PREFERRED EMBODIMENTS OF THE
INVENTION

Referring now to the system device 10 herein in the depictions of FIGS. 1-6, there is seen in those figures graphic depictions of the energy storage and recovery system 10 herein.

Figure 1:
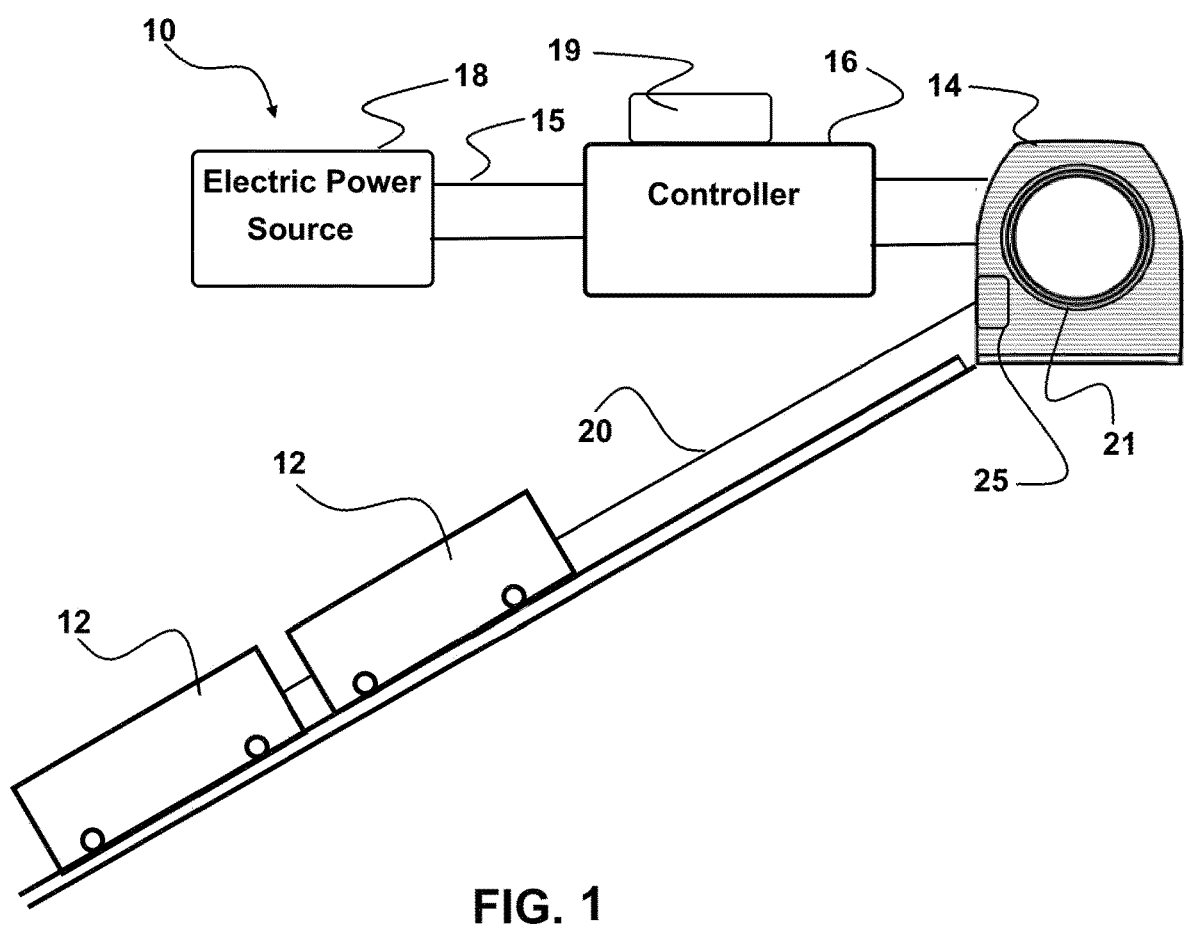
FIG. 1 depicts one mode of the energy storage and recovery system herein, wherein an electric power source, such as the grid or an renewable energy farm, is stored by the lifting of weights along a ramp.
Figure 2:
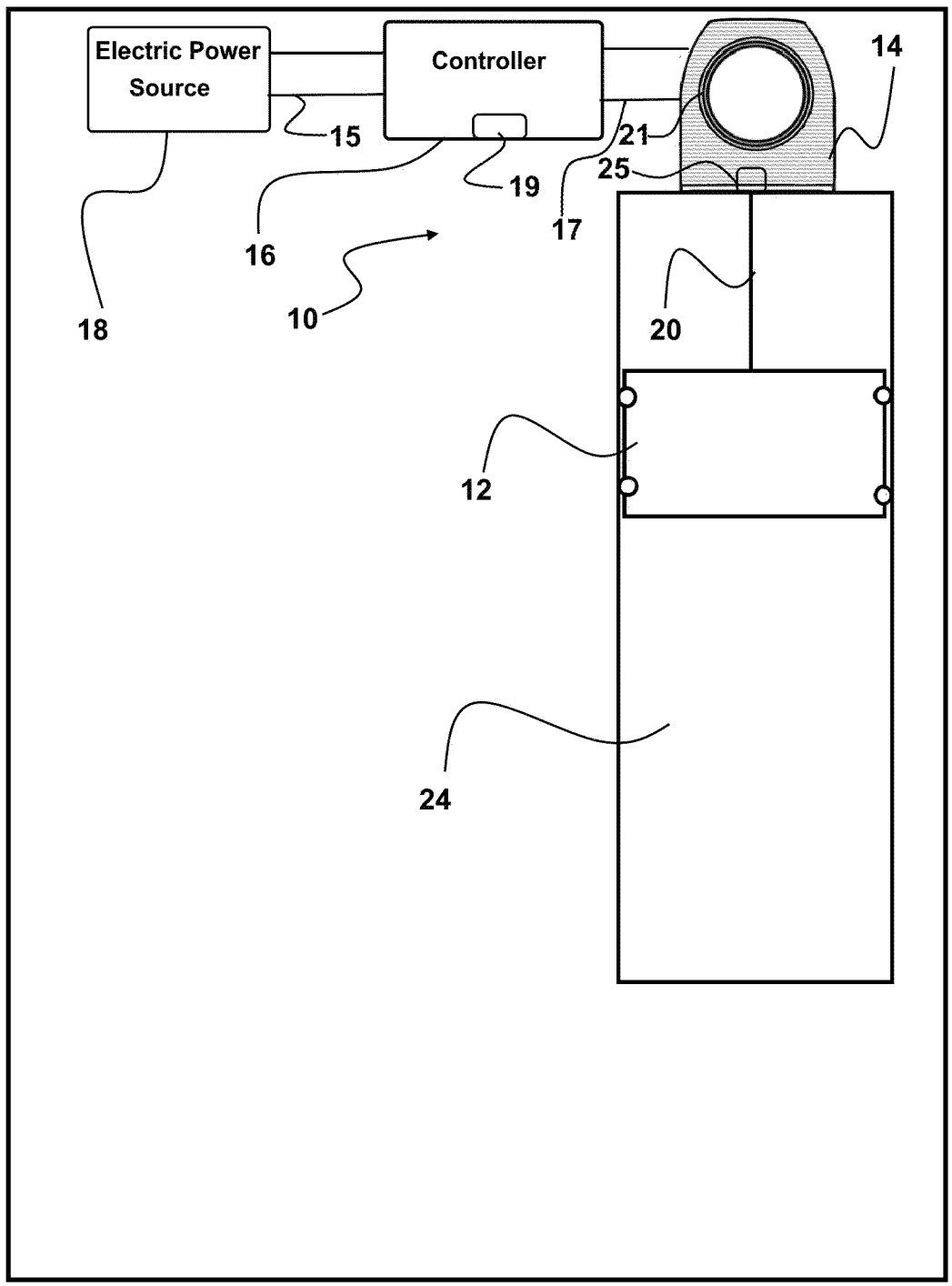
FIG. 2 depicts another mode of the energy storage and recovery system herein, wherein power from an electrical power source such as the grid or from a renewable energy farm is stored by the lifting of one or a plurality of weights vertically in a shaft.

Shown in FIGS. 1-2 are depictions showing modes of operation of the system 10 herein. Both modes employ one or a plurality of weights 12 which are operatively engaged with a generator 14 or motor-generator. By weights 12 is meant a body having mass which is engaged to a flexible member such as a cable 20 which will move in a first direction when pulled by gravity and will move in an opposite second direction when force from an energized dynamo-motor pulls on the cable in the opposite direction. Such weights may include a body having mass such as concrete blocks or metal blocks, or an elevator, or other weighted bodies which are translatable in multiple directions and connected to a flexible member such as a cable 20 extending between the weight 12 and generator 14.

Generator 14 is used herein for convenience and by generator 14 herein is meant a brushless electric motor, an electric motor having brushes, an alternator or similar electronic component, which will generate electricity when rotated by a power source, and which will operate as an electric motor when electricity is operatively communicated to it to do so. Any AC or DC, brushed or brushless motor or generator or alternator, which will operate in this fashion, is considered to be a generator 14. One especially well suited generator for use herein is a dynamotor (or dynamo-motor) which has the motor coils and has generator coils wound around a single rotor, thereby allowing it to operate either as an electric motor, when electric power is communicated to it, or as an electric generator when it is rotated by a source of powered rotation. Powered rotation can include propellers spun by wind, turbines spun by moving water, water wheels, or other means to communicate powered rotation to the generator 14.

Typically, and well known in the art, the motor coils of a motor-generator, herein referred to as one preferred type of generator 14 for convenience and in no way limiting, are driven from a commutator on one end of a rotating shaft, while the generator coils provide output to another commutator on the other end of the shaft. While the other noted electric motors will function as a motor or electric generator, a motor-generator is especially well suited for such.

In the system 10 herein, a controller 16 is electrically engaged to a source of generated electric power, such as the grid 15 of a city or state or another wired connection to the electric power source 18. When the controller communicates the electric power so received to the motor coils of the generator 14, such as an electric motor or motor-generator, it operates as an electric motor and provides powered rotation which can be employed to accomplish work such as lifting a weight.

When the controller 16 senses electric power being communicated over a wired connection 17 from the generator 14, it will operate conversely to detect and receive that input of electrical power from the wired connection 17 engaged between the generator 14 and the controller 16 and communicate it to the grid 15.

If the system 10 operates in the electric energy storage mode, employing the weights 12 in a cabled connection to the generator 14, electric power from an electric power source 18 is communicated over wires such as a grid 15 to the controller 16 connected to it. When a switch 19, operatively connected to or formed as part of the controller 16, is switched to cause the controller 16 to operate in energy storage mode, the controller 16 will operate to communicate electric power from the electric power source 18 to the generator 14. When electric power is so communicated to a generator 14, such as to the power coils of a motor-generator, it will cause the generator 14 to rotate and thereby provided powered rotation.

This powered rotation is communicated to a flexible member, such as a cable 20 engaged to wind up on a reel 21 or the like connected to and thereby rotated by the generator 14. With the controller 16 switched to energy storage mode, the powered rotation of the generator 14 to a reel 21 or the like will wind the cable 20 thereon. This winding will operate to lift the one or plurality of weights 12 above a lowest elevation thereof, toward a highest elevation thereof. Currently, a cable 20 provides the flexible member and the means for operative engagement between the generator 14 and the weight 12, and due to inexpensive cost and reliability, such is preferred. The generator 14 may also have a shaft connected to a remote cable reel 21 or the like rather than having the coil 21 on the rotating shaft of the generator 14. In either instance, operating in energy storage mode, the cable 20 is wound by the force of the generator 14 when electric power is communicated from the grid 15 through the controller 16 to the generator 14.

In all modes of the system 10, the controller 16 is preferably "smart" and operating in direct, wired, or wireless communication with a microprocessor or computer and electronic memory for running software operating to tasks of switching 19 the controller 16 between energy storage mode and energy generation mode.

In a preferred mode of the system 10, it is well suited for use where electric power on the grid 15 is sold at differing rates. The system 10, when the electric energy provided by a power plant to the grid 15 is being sold at a reduced price during late evening and early morning or other hours when demand is low, software running in electronic memory and operating to the task of determining a current price for generated power will cause the controller 16 to operate in energy storage mode.

In energy storage mode, the controller 16 will cause electric power from the grid 15 to be communicated to the generator 14 wherein the electric motor operation mode of the generator 14 will operate to the provided powered rotation to a reel 21 or the like. This will cause the powered winding of the cable 20 upon the reel and operate to lift the weights 12.

Conversely, when the software running on the computer or microprocessor, either as part of the controller 19 or in operative communication with the controller 16, such as over a computer network like the internet, operates to the task of determining current utility rates are at a high energy cost, the controller 16 can be switched 19 to energy generation mode. When switched to energy storage mode, the weight 12 is allowed to move under the force of gravity, whereby the cable 20 will rotate the generator 14. This rotation imparted from the force of the weights 12 moving downward or to lower elevation, generates electric power in the generator 14. This generated electric power is communicated to the grid 15 over a wired connection 17 and can be fed to the home or business electric system to lower the draw thereof of some or all of the more expensive electric grid power and to reduce costs.

The controller 16 may operate a brake 25 to move to an engaged position which will cause the cable 20 to hold in a fixed position. The brake 25 will hold the cable 20 and the connected weight 20 in a fixed position until the controller operates or signals the brake 25 to change to a released position, allowing free movement of the cable 20. As noted herein, by brake 25 is meant any controllable means to hold the cable removably fixed in place such as contact with frictional surfaces, locking gear trains, and any other conventional manner for a releasable stop to movement of the cable.

When the controller 16 and software running to the tasks, as noted herein, changes to energy storage mode, the controller 16 will place the cable 20 in a released position by changing the brake 25 to a released position allowing winding of the cable 20. Immediately upon cessation of the energy storage mode, the controller may place the brake 25 in a second or the engaged position to impart frictional or mechanical force to maintain the cable 20 wound on the reel 21. This will prevent rotation of the generator 14 by the force of the raised weight 12 on the cable 20 by preventing movement thereof.

The brake 25 is preferably maintained in the second or engaged position until the system 10 is changed to the energy generation mode by the controller 16. Upon the change to energy generation mode the brake 25 is moved to the first position and released to allow the weight 12 to move the cable 20 and thereby rotate the generator 14. The system 10 may also have a third position for the brake 25 employed, wherein communication against the cable 20 or the reel 21 or other components in the operation of the cable 20 in winding on the reel 2, will slow the speed of rotation of the generator 14, should the weight 12 be pulling the cable 20 too fast for the generator 14 or to regulate the electric output of the generator 14. The brake 25 herein may be mechanical and frictional or may be magnetic, or may be communicated to the reel 21 or the cable 20 or pulleys or components operating between the reel 21 and the cable 20 by a mechanical component.

In another example of operation, power outage software running on a computer, which operates to monitor the electric power available on the grid 15, can determine a power outage wherein the electric power from the electric power source 18 powering the grid 15, has ceased. The power outage software will operate to cause the controller 16 to switch to energy generation mode, wherein electric power provided by the generator 14 from the weights 12 lowering and rotating it, can be fed to the building or business to provide electric power during the outage.

In a third example of operation of the system 10 herein, when located on a renewable energy farm or the like, excess power sensing software running on a computer and in communication with the controller 16 will operate to the task of determining if excess or unneeded electricity is being generated. The excess power sensing software will determine if the electricity generated on the energy farm by windmills, solar panels, or other power generators is going unused. Such is a frequent occurrence especially on energy farms having windmills powering generators which may turn in the wind when the power grid does not need the energy.

In this mode of the system, once the excess power sensing software operating to the task of determining power is going unused or is being generated in excess, it will cause the controller 16 to switch to energy storage mode. As noted, in this mode, the excess electric energy will be communicated over the wired connection 17 to the generator 14. By communicating the excess electricity received from the energy farm power source, such as windmill driven turbines and solar panels, the generator 14 is energized to impart powered rotation to the reel 21 and cable 20. This will, as above, cause the generator 14 to rotate under power to wind the cable 20 and lift the weights 12 to store the energy.

When the excess power sensing software operating on the computer determines some or all of the energy generated on the energy farm is needed or the grid 15 is short of power, it will cause the controller 16 to switch to power generation and cause the generator 14 to employ the power of movement of the weights 12 downward, to generate electrical power for the grid 15 or for local use such as on a building, farm, or home. In this excess power mode, only part of or all of the electricity generated on the energy farm can be stored depending on what amount is sensed as needed by the grid 15 at the moment. This will allow the system 10 to store unneeded electrical power rather than feathering the windmills as is frequently done when electric power is not needed by the grid 15.

Figure 3:
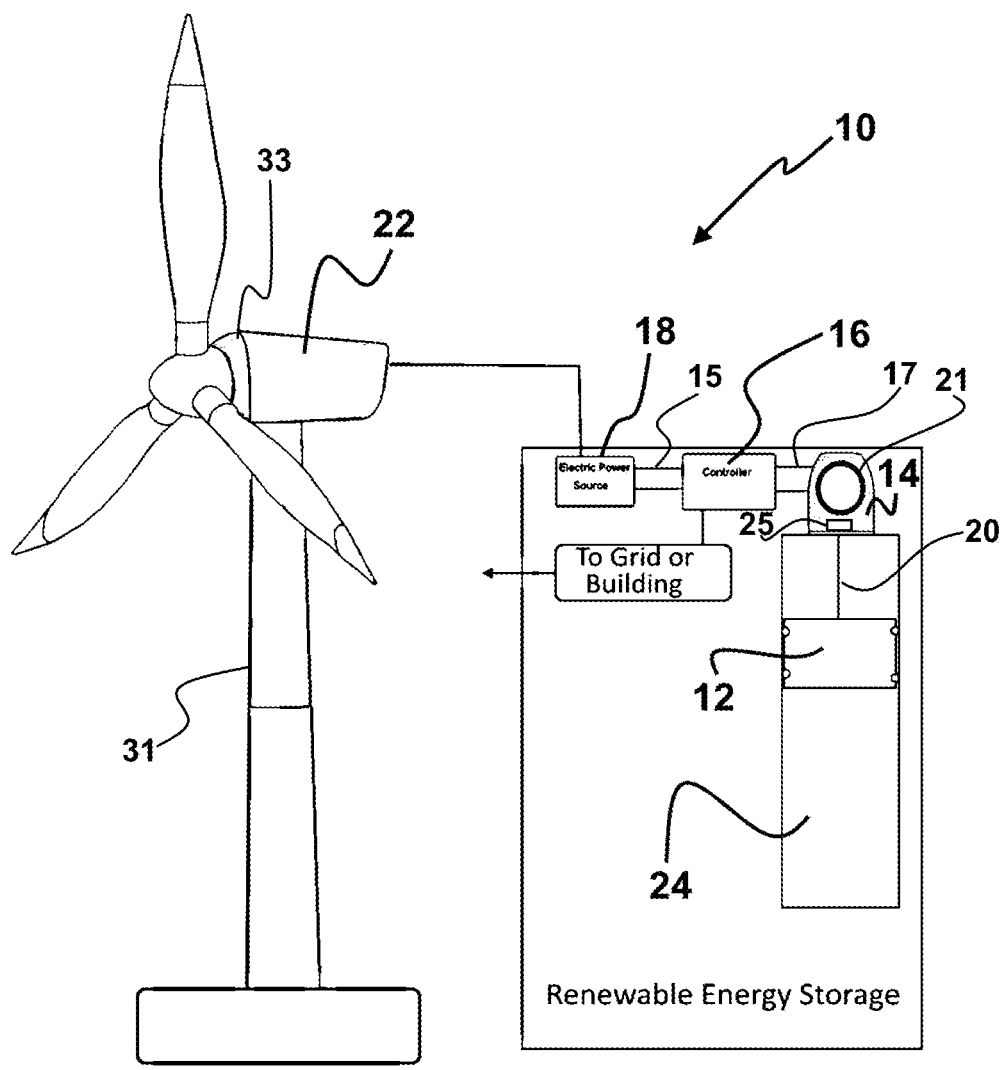
FIG. 3 shows an example of the energy storage and recovery system herein, wherein one or a plurality of vertical shafts are engaged to one or a plurality of windmills or solar panels or the like to store renewable energy.
Figure 5:
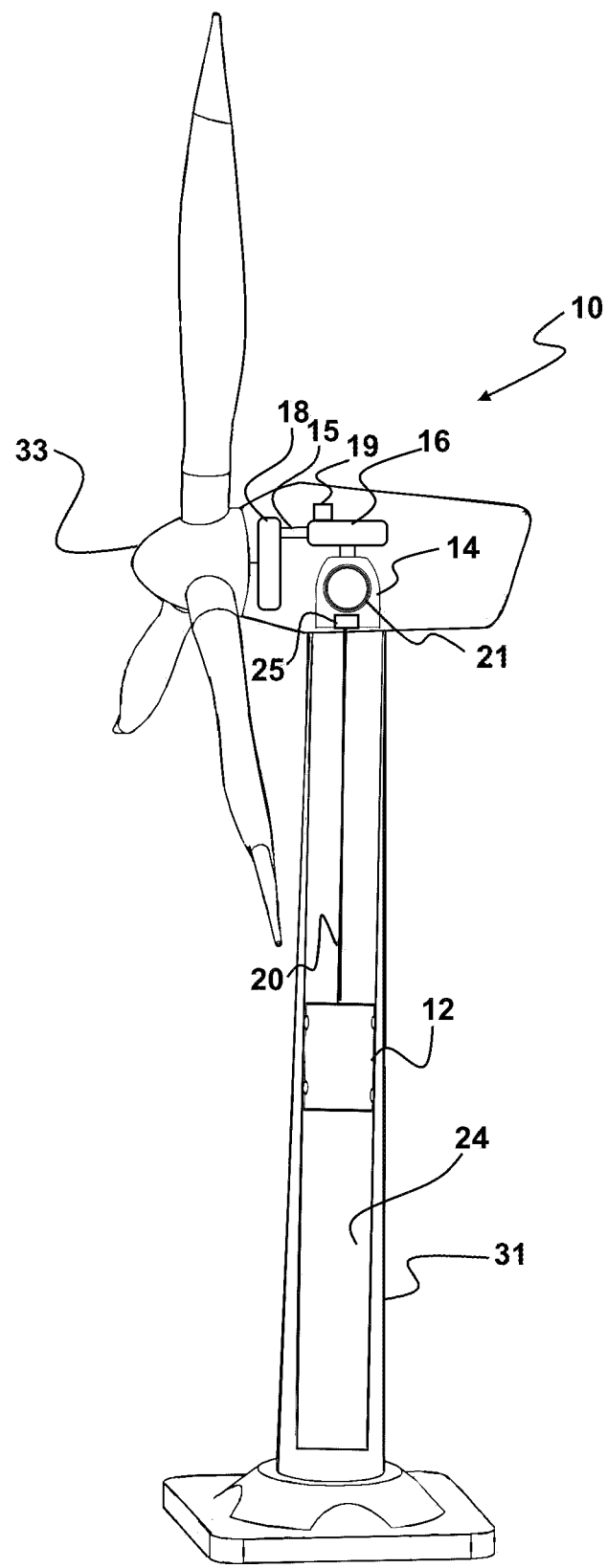
FIG. 5 shows a mode of the energy storage system herein incorporating the system of FIG. 2 or 3 within a support structure for a windmill electric power generator.

FIGS. 3 and 5 show graphic depictions of the use of the system 10 in a renewable energy farm wherein renewable electric power generators 22, such as a windmills or solar panels are in operation. In the above noted operation of the system 10, the electric energy from the renewable source providing the electric power source 18 is either stored by operation of the controller 16, or the generator 14 is switched to provide power to the grid 15 or local system when such a need is determined and the controller 16 actuated to do such.

Figure 4:
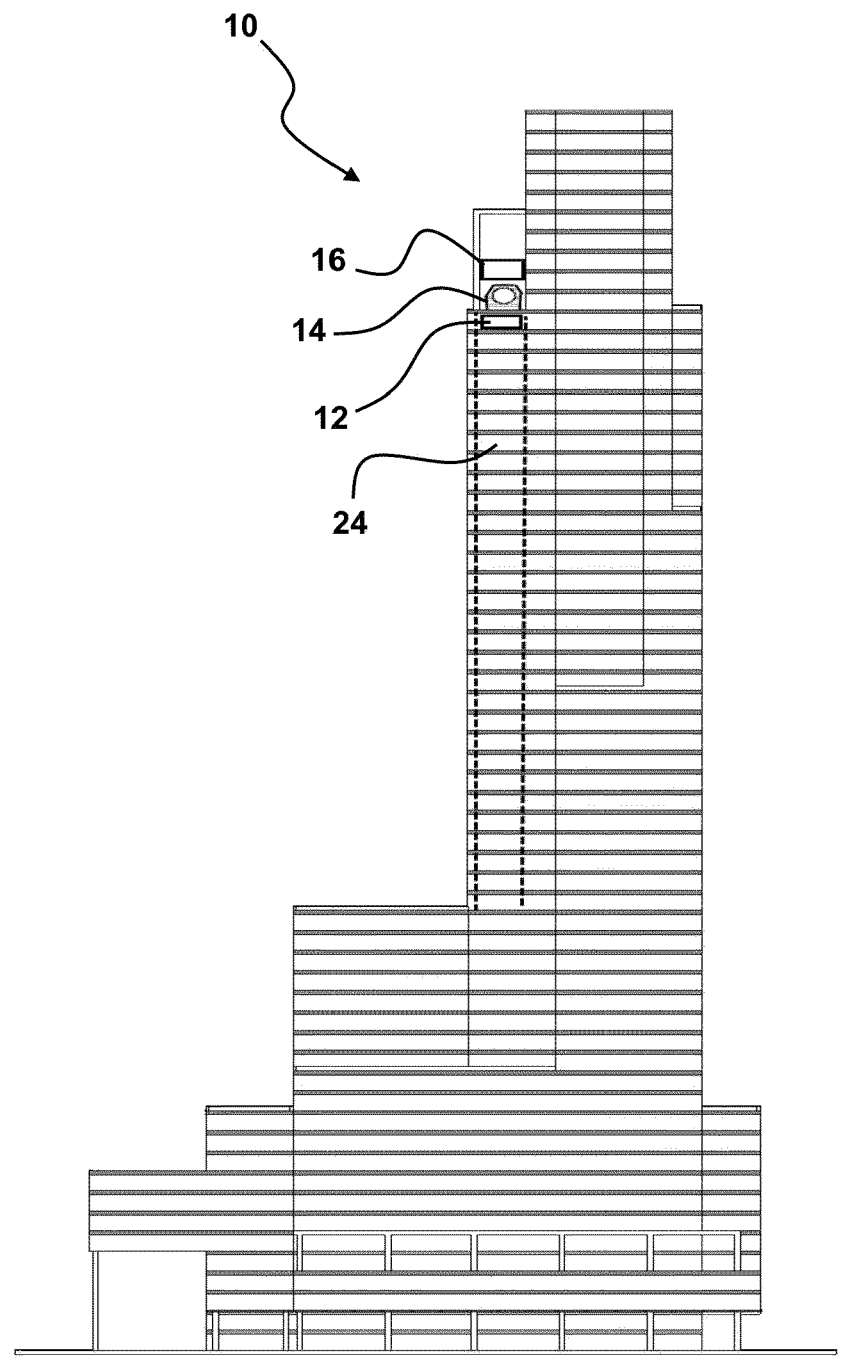
FIG. 4 depicts an example of a mode of the energy storage and recovery system herein, such as that of FIG. 2, wherein a multistory building is built or retrofitted to allow storage of off peak electrical power or renewable energy to reduce electric costs.

Depicted in FIG. 4 is a graphic showing an example of employment of the system 10, as in FIG. 1, for operation, as noted above, by the controller 16 and software operating to the task of switching between energy storage and energy generation modes.

Multistory buildings may be easily built or retrofitted to provide a vertical shaft 24 for operative positioning of the weight 12 therein. During energy generation mode, the weight or weights 12 will move lower in the shaft 24. During energy storage mode, the generator 14 will be commanded by the controller 16 to operate as a motor to raise the weight 12 in the shaft. Such a system can, for example, provide the building with reduced energy costs by storing grid power during low cost hours and employing the generator 14 to generate electricity during peak price hours to lower use during those peak hours by the building.

In FIG. 5, as noted, is shown a mode of the system herein, wherein the weight 12 and cable 20 are held within the support tower for a windmill. This will allow every windmill on an energy farm, having many such windmills, to store power when the grid does not need it and to use the generator 14 rotated by the moving weight 12 housed within the support tower to provide power to the grid 15 when needed, even if the wind has ceased blowing.

Figure 6:
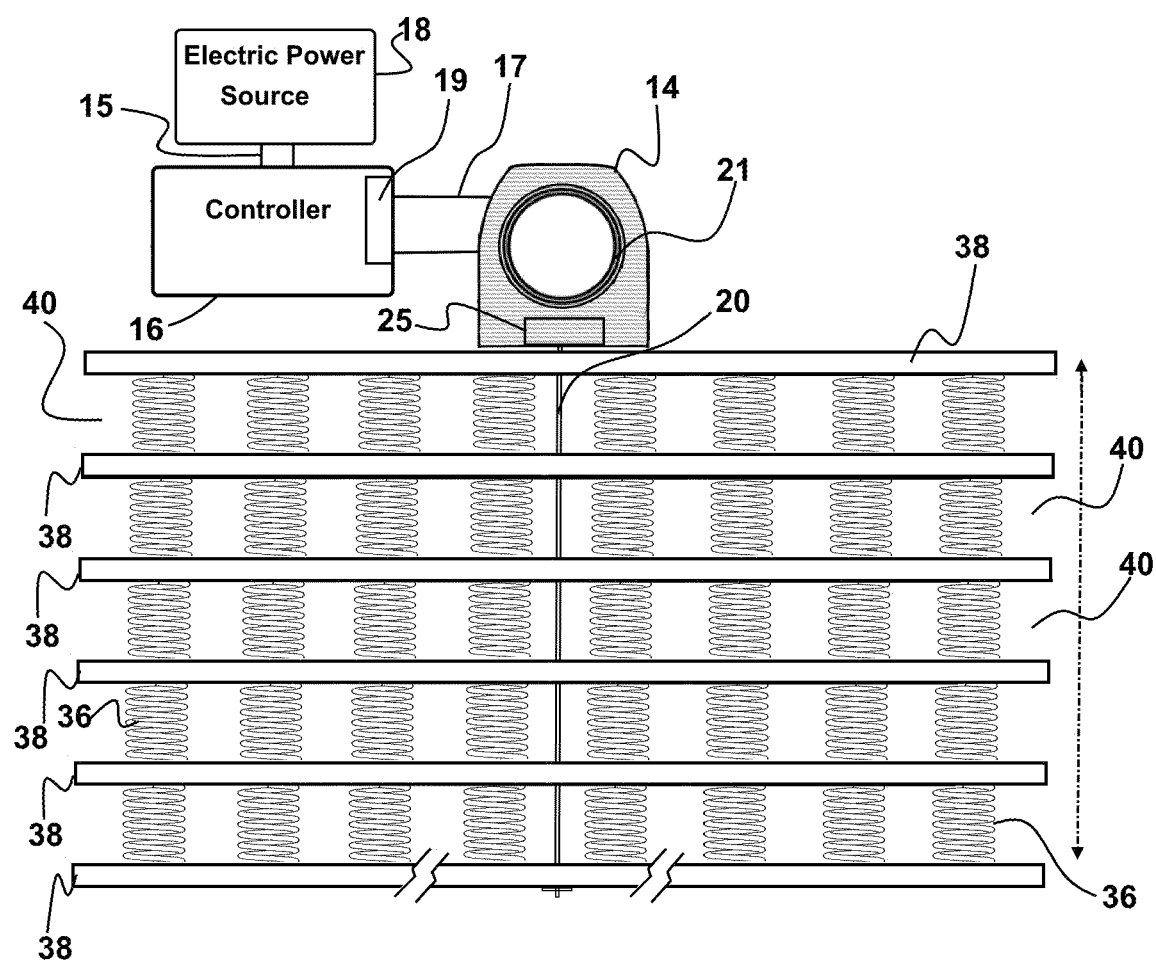
FIG. 6 depicts a configuration of the energy storage system herein employing biased sections which are compressible to store energy.

Shown in FIG. 6, there is a configuration of the energy storage system 10 herein employing biasing members, such as springs 36, to provide the force to pull upon the cable 20. As shown, a plurality of planar members 38 form a stack thereof having springs 36 positioned in gaps 40 between each planar member 38 in the stack. A first of the planar members 38 is fixed in position such as being engaged with the motor 14. A last one of the plurality of planar members 38 is engaged with the cable 20 which is in a sliding engagement with the other planar members 38 in the stack.

When the controller 16 switches the system to energy storage mode, electric power from an electric power sources 18 and communicated to the generator 14, will cause it to rotate and wind the cable 20. The winding of the cable 20 will pull the last of the planar members 38, which is connected to the cable 20, to move toward the first of the planar members 38. Such will also cause each of the planar members 38 in the stack to move closer to adjacent planar members 38 in the stack, thereby narrowing the gap 40 therebetween in which the biasing members, such as springs 36 are positioned.

The narrowing of each of the gaps 40 as the cable 20 pulls the last of the planar members 38 toward the generator 14, collapses the springs 36 causing them to exert force on both planar members 38 across the gap 40 in which the springs 36 are located. The collapsing of the stack of planar members 38, thus, compresses all of the springs 36 in the stack, thereby storing energy in the compressed springs 36 of the stack in a collapsed configuration. Upon cessation of the communication of electric power to the generator 14 and cessation of the energy storage mode, a brake 25 may be engaged to maintain the cable 20 taught, and hold the stack in the collapsed configuration.

Upon switching to the energy generation mode of the system 10, the brake 25 may be released thereby allowing the stack of planar members 38 to move toward an expanded configuration from the collapsed configuration. The biasing force of the springs 36 between and against each planar member 38 across each respective gap 40 will cause them to move away from each other. A terminating planar member 38, which would be the planar member 38 furthest from the generator 14, as noted, is engaged with the cable 20. The movement of all the planar members 38 away from each other, caused by the springs 36 expanding, will move the terminating planar member 38 connected to the cable 20 away from the generator 14 and impart the combined force of all the springs 36 to move the cable 20 as the stack moves toward an expanded configuration where each spring 36 is fully expanded. There is no limit to the number of planar members 38 paired across respective gaps 40 having biasing springs 36 imparting force to separate adjacent planar members.

While all of the fundamental characteristics and features of the disclosed energy storage and recovery system herein have been shown and described herein, with reference to particular embodiments thereof, a latitude of modification, various changes and substitutions are intended in the foregoing disclosure and it will be apparent to those skilled in the art, that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions as would occur to those skilled in the art, are considered as included within the scope of the invention as defined by the following claims.

What is claimed is:

1. An electric energy storage and recovery system comprising:
   a generator, said generator operating to produce electric power upon communication of powered rotation thereto;
   said generator operating as an electric motor upon communication of electrical power thereto;
   a reel, said reel in a winding engagement with a cable having a weight thereon;
   said reel rotationally engaged to said generator;
   said generator operatively engaged to a windmill positioned at an upper end of a support tower opposite a lower end thereof in a connection with a support surface;
   said cable having said weight thereon positioned within an axial passage of said support tower;
   said lowered position of said weight being at said lower end of said tower;
   said elevated position of said weight being at or adjacent said upper end of said support tower;
   a controller, said controller in communication with an electric grid connected to an electric power source;
   said controller switchable to an energy generation mode, wherein it connects said electric power from said generator to said electric grid;
   said controller switchable to an energy storage mode, wherein it operates to communicate said electric power from said electric grid to said generator to cause said generator to operate as said electric motor;
   said reel rotating to wind said cable thereon and to move said weight from a lowered position to an elevated position while said controller is in said energy storage mode; and
   said reel rotating to unwind said cable thereon to communicate said powered rotation to said generator, with said controller in said energy generation mode, wherein electric power produced by said generator is communicated to said grid with said controller in said energy generation mode, and rotational energy to communicate said powered rotation to said generator is stored by movement of said weight from said lowered position to said elevated position, with said controller in said energy storage mode.

2. The electric energy storage and recovery system of claim 1 further comprising:
   a computer in electronic communication with said controller;
   software running in electronic memory of said computer operating to the task of determining a current utility rate charged for said electric power, said current utility rate being a rate between a highest charged rate and a lowest charged rate;
   said controller operating to switch to said energy storage mode when said current utility rate is closer to said lower charged rate; and
   said controller operating to switch to said energy generation mode, when said current utility rate is closer to said highest charged rate.

3. The electric energy storage and recovery system of claim 1 further comprising:
   a computer in electronic communication with said controller;
   software running in electronic memory of said computer operating to the task of determining a current power requirement of the power grid; and
   said controller operating to switch to said energy storage mode when said current power requirement of said power grid is sufficient without the communication of said electric power produced by said generator.

* * * * *